United States Patent
Shin et al.

(10) Patent No.: US 10,346,033 B2
(45) Date of Patent: Jul. 9, 2019

(54) ELECTRONIC DEVICE FOR PROCESSING MULTI-TOUCH INPUT AND OPERATING METHOD THEREOF

(71) Applicant: Samsung Electronics Co., Ltd, Suwon-si (KR)

(72) Inventors: Sang-Min Shin, Osan-si (KR); Hoik Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/041,990

(22) Filed: Feb. 11, 2016

(65) Prior Publication Data

US 2016/0231923 A1  Aug. 11, 2016

(30) Foreign Application Priority Data

Feb. 11, 2015  (KR) ........................ 10-2015-0020611

(51) Int. Cl.
*G06F 3/041* (2006.01)
*G06F 3/0488* (2013.01)

(52) U.S. Cl.
CPC ............. *G06F 3/04883* (2013.01); *G06F 2203/04808* (2013.01)

(58) Field of Classification Search
CPC .............................................. G06F 3/048
USPC .................................. 345/173–174
See application file for complete search history.

(56) References Cited

U.S. PATENT DOCUMENTS

| | | | | |
|---|---|---|---|---|
| 2012/0303548 A1* | 11/2012 | Johnson | ................ | G06Q 40/04 705/36 R |
| 2013/0205210 A1* | 8/2013 | Jeon | .................... | G06F 3/04883 715/716 |
| 2014/0002399 A1 | 1/2014 | Kambhatla et al. | | |
| 2014/0035853 A1* | 2/2014 | Ok | ....................... | G06F 3/0416 345/173 |
| 2014/0111429 A1* | 4/2014 | Layton | ................. | G06F 3/0416 345/157 |
| 2015/0281902 A1* | 10/2015 | Lehtiniemi | ............ | G06F 3/048 455/456.3 |
| 2015/0338942 A1* | 11/2015 | Stone | ................... | G06F 3/0488 345/173 |

FOREIGN PATENT DOCUMENTS

| | | |
|---|---|---|
| KR | 20140075391 A | 6/2014 |
| KR | 20140089524 A | 7/2014 |
| KR | 20140092694 A | 7/2014 |

* cited by examiner

*Primary Examiner* — Roy P Rabindranath

(57) ABSTRACT

An operating method for an electronic device includes detecting a touch input including a plurality of touch points on the screen, obtaining the positional relationship of the plurality of touch points, and performing a function corresponding to the touch input based on the positional relationship. An electronic device includes a screen configured to detect a touch input comprising a plurality of touch points on the screen, and a controller configured to obtain a positional relationship of the plurality of touch points, and to perform a function corresponding to the touch input based on the positional relationship. Other embodiments are provided.

14 Claims, 23 Drawing Sheets

US 10,346,033 B2

ELECTRONIC DEVICE FOR PROCESSING MULTI-TOUCH INPUT AND OPERATING METHOD THEREOF

CROSS-REFERENCE TO RELATED APPLICATION AND CLAIM OF PRIORITY

The present application is related to and claims the priority under 35 U.S.C. § 119(a) to Korean Application Serial No. 10-2015-0020611, which was filed in the Korean Intellectual Property Office on Feb. 11, 2015, the entire contents of which are hereby incorporated by reference.

TECHNICAL FIELD

The present disclosure relates to an electronic device including a touch screen, and more particularly to an electronic device which process a multi-touch input on the screen and an operating method thereof.

BACKGROUND

The electronic devices have been developed to process various functions at the same time. The electronic devices are required to be light, small, and simple in order for the user to easily carry the same and are required to provide a more convenient user experience.

In order to improve the user's experience, various electronic devices have been developed to adopt a touch screen that is implemented by integrating a touch panel and a display panel to be used as a display device of the electronic device. The touch screen enables the reception of a user input as well as the provision of displaying information to the user. Various electronic devices have been simple and have been designed to detect an intuitive gesture in order to improve the interaction with the user. The gestures may be made by using a part of a user's body (e.g., fingers), other devices, or objects (e.g., a stylus).

Conventional electronic devices support a multi-touch input that includes a plurality of touch points as well as a single touch input that includes a single touch point. The multi-touch input may variously extend the touch gestures that are limited in a single touch input.

However, in spite of the above improvement, the conventional multi-touch input merely relies on the number of touch points, and it is still insufficient to provide improvements to fully satisfy the requirements for the environment in which a multitude of functions of the electronic device are newly provided.

The technical background described above shall be construed as background information for better understanding of the various embodiments of the present disclosure, and shall not be construed as the prior art in relation to the present disclosure.

SUMMARY

To address the above-discussed deficiencies, it is a primary object to provide a processing method of a multi-touch input, which is able to extend touch gestures for the multi-touch input, and an apparatus that supports the same.

In accordance with an aspect of the present disclosure, an operating method of an electronic device may include: detecting a touch input that includes a plurality of touch points on the screen; obtaining the positional relationship between the plurality of touch points; and performing a function corresponding to the touch input based on the positional relationship.

According to the method and the apparatus supporting the same, in accordance with various embodiments of the present disclosure, the present disclosure can extend the touch gesture for a multi-touch input in order to thereby provide a wider range of user experiences.

These and other aspects and embodiments of the present disclosure are more fully described hereinbelow.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts: The above and other aspects, features, and advantages of the present disclosure will be more apparent from the following detailed description taken in conjunction with the accompanying drawings, in which.

DETAILED DESCRIPTION

Figure 1:
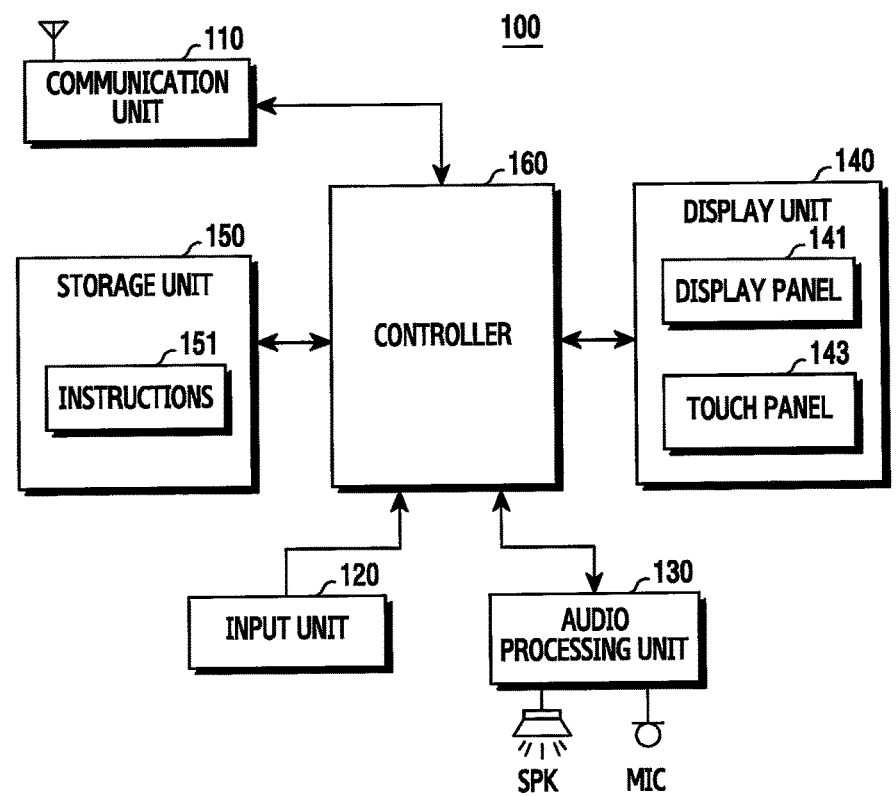
FIG. 1 schematically illustrates the configuration of an apparatus that supports the processing of a multi-touch input, according to an embodiment of the present disclosure.

FIGS. 1 through 23, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic devices. Various embodiments of the present disclosure will be described herein with reference to the accompanying drawings, in which like reference numbers are used to depict the same or similar elements, features, and structures. Various modifications and changes to the embodiments of the present disclosure may be made without departing from the scope and spirit of the present disclosure. Specific embodiments are illustrated in the drawings and a related detailed description is provided. However, the embodiments described herein do not limit the present disclosure to a specific embodiment, and should be understood as including all modifications and equivalents or alternatives included in the spirit and technical scope of the present disclosure.

The expressions "comprise" and "may comprise" as used herein indicate the existence of disclosed corresponding functions, operations, or constituent elements, etc. and do not limit additional functions, operations, or constituent elements, etc. Also, the terms "comprise" and "have" should be understood to designate the existence of features stated in the specification, numerals, steps, operations, constituent elements, components or a combination thereof, and not excluding the possibility of the existence or addition of one or more other features, numerals, steps, operations, constituent elements, components or combinations thereof.

As used herein, the term "or" includes any and all combinations of words enumerated together. For example, "A or B" may include A, or may include B, or may include A and B.

The terms "1st", "2nd", "first" or "second", etc. as used herein may modify various constituent elements, but do not limit corresponding constituent elements. For example, the expressions do not limit the order and/or importance of the corresponding constituent elements. The expressions may be used to distinguish one constituent element from another constituent element. For example, both a first user device and a second user device are user devices and represent user devices different from one another. For example, a first constituent element may be referred to as a second constituent element without departing from the scope of the present disclosure. Likewise, a second constituent element may be referred to as a first constituent element.

When a constituent element is "connected" to or "accessed" by another constituent element, it is understood that the first constituent element may not only be directly connected to or accessed by the second constituent element, but also a new third constituent element may exist between the first constituent element and the second constituent element. On the other hand, when a constituent element is "directly connected" to or "directly accessed" by another constituent element, it is understood that no third constituent element exists between the first constituent element and the second constituent element.

The terms used herein are used merely to explain embodiments of the present disclosure, and do not limit the various embodiments of the present disclosure.

An expression of a singular number includes the expression of a plural number unless the context clearly dictates otherwise.

Unless defined otherwise, all terms used herein, including technical or scientific terms, have the same meaning as those commonly understood by a person having ordinary knowledge in the art to which the present disclosure belongs.

Terms as defined in a general dictionary should be interpreted as having meanings consistent with the contextual meanings of a related technology, and should not be interpreted as having ideal or excessively formal meanings unless explicitly defined herein.

An electronic device according to an embodiment of the present disclosure may be a device including a display function. For example, the electronic device may include at least one of a smart phone, a tablet Personal Computer (PC), a mobile phone, a video phone, an electronic book (e-book) reader, a desktop PC, a laptop PC, a netbook computer, a Personal Digital Assistant (PDA), a Portable Multimedia Player (PMP), an MPEG Audio Layer 3 (MP3) player, a mobile medical instrument, a camera, or a wearable device (e.g., a Head-Mounted Device (HMD) such as electronic glasses, electronic clothes, an electronic bracelet, an electronic necklace, an electronic accessory, an electronic tattoo, or a smart watch).

According to an embodiment of the present disclosure, the electronic device may be a smart home appliance having a display function. The smart home appliance, for example, the electronic device may include at least one of a television, a Digital Video Disk (DVD) player, an audio system, a refrigerator, an air conditioner, a cleaner, an oven, a microwave, a washing machine, an air cleaner, a set-top box, a TV box (for example, Samsung HomeSync®, Apple TV®, or Google TV®), a game console, an electronic dictionary, an electronic locking system, a camcorder, or an electronic picture frame.

According to an embodiment of the present disclosure, the electronic device may include at least one of various medical instruments (e.g., Magnetic Resonance Angiography (MRA) machine, Magnetic Resonance Imaging (MRI) machine, Computerized Tomography (CT) machine, a moving camera, an ultrasonic machine, etc.), a navigation device, a Global Positioning System (GPS) receiver, an Event Data Recorder (EDR), a Flight Data Recorder (FDR), a car infotainment device, an electronic equipment for ship (e.g., a navigation device for a ship and a gyrocompass, etc.), avionics, a security instrument, a head unit for vehicles, an industrial or home service robot, an Automatic Teller Machine (ATM), or a Point Of Sales (POS) machine.

According to an embodiment of the present disclosure, the electronic device may include at least one of a part of furniture or building/structure including a display function, an electronic board, an electronic signature receiving device, a projector, or various metering instruments (e.g., tap water, electricity, gas, or radio wave metering instrument, etc.).

The electronic device according to an embodiment of the present disclosure may be one of the aforementioned various devices or a combination of two or more of them. Also, the electronic device according to an embodiment of the present disclosure may be a flexible device. Also, the electronic device according to an embodiment of the present disclosure is not limited to the aforementioned instruments.

The term 'user' as used herein may denote a person who uses the electronic device or a device (e.g., an artificial-intelligence electronic device) which uses the electronic device.

FIG. 1 schematically illustrates the configuration of an apparatus that supports the processing of a multi-touch input, according to an embodiment of the present disclosure.

Referring to FIG. 1, the electronic device 100 may include a communication unit (or a communication module) 110, an input unit 120, an audio processing unit (or an audio processor) 130, a display unit (or a display) 140, a storage unit (or a memory) 150, and a controller (or a processor, or a processing circuit) 160.

The electronic device 100, which has the above-described configuration according to the embodiment of the present disclosure, may obtain the positional relationship between a plurality of touch points according to a multi-touch input, and may perform a function corresponding to the touch input based on the obtained positional relationship. And, the multi-touch input may include a plurality of touch points. For example, the multi-touch input may be made by touching a plurality of points at the same time.

According to various embodiments of the present disclosure, the electronic device 100 may support a multi-touch input that is caused by a variety of gestures. For example, the electronic device 100 may support a multi-touch input corresponding to a gesture (e.g., a tab gesture) in which a touch is made on two or more points and is released without moving. Alternatively, the electronic device 100 may support a multi-touch input corresponding to a gesture (e.g., a double-tap gesture) in which a touch is consecutively made two times on two or more points. Alternatively, the electronic device 100 may support a multi-touch input that corresponds to a gesture (e.g., a touch-and-drag gesture or a flicking gesture) in which a touch is made on two or more points and is released after moving. Moreover, the electronic device 100 may support a multi-touch input that includes a plurality of touch points according to various gestures.

The communication unit 110 is configured to support a communication function of the electronic device 100. According to various embodiments, the communication unit 110 may be added to the electronic device 100 that is manufactured to support the communication function. Therefore, in the case where the electronic device 100, to which the present disclosure may be applied, does not support the communication function, the communication unit 110 may be omitted from the configuration of the electronic device 100. Meanwhile, the communication unit 110 may be provided in the form of a mobile communication module for supporting a communication function (for example, a mobile communication function) of the electronic device 100. The communication unit 110 may form a communication channel with a mobile communication system in order to thereby support the transmission and reception of signals for performing the mobile communication function of the electronic device 100. For example, the communication unit 110 may form at least one of a voice service channel, a video service channel, or a data service channel with the mobile communication system, and may support the transmission and reception of a specific signal according to the corresponding service channel.

The communication unit 110, according to an embodiment of the present disclosure, may support the reception of instructions, which is based on a multi-touch input. The instructions may be received in real time from a web server or other devices based on a web access function or other device communication functions.

The input unit 120 may be configured to generate various input signals necessary for the operation of the electronic device 100. The input unit 120 may be configured with a variety of input devices, such as a keyboard, a keypad, or key buttons according to the compatibility of the electronic device 100.

According to an embodiment of the present disclosure, in the case where the display unit 140 is provided with a touch screen, the input unit 120 may be configured in the form of a touch map that is displayed on the touch screen. According to an embodiment, the input unit 120 may create a multi-touch input.

The audio processing unit 130 may output a variety of audio data that is configured for the operation of the electronic device 100, audio data according to the reproduction of audio files that are stored in the storage unit 150, or audio data that is received from the outside. In addition, the audio processing unit 130 may support an audio data collecting function. To this end, the audio processing unit 130 may include a speaker (SPK) and a microphone (MIC). According to various embodiments, the audio processing unit 130 may output a variety of sound effects or an information sound related to the processing of a multi-touch input under the control of the user or the controller 160. For example, when an instruction is executed in response to a multi-touch input, the sound effect, according to the execution of the instruction, may be output. The output of the sound effects or the information sound of the audio processing unit 130 described above may be omitted according to the user's configuration or the designer's intention.

The display unit 140 may be configured to provide various screen interfaces necessary for the operation of the electronic device 100. The display unit 140, according to the embodiment of the present disclosure, may support the output of content (e.g., the application or an application program) based on the instruction corresponding to a multi-touch input.

The display unit 140 may be provided as a touch screen that is made of a display panel 141 and a touch panel 143, which are superposed. The display panel 141 may output images and text corresponding to various screens described above, and may output one or more screen interfaces among the interfaces described above. The touch panel 143 may configure a valid touch area where the touch input is normally collected and an invalid touch area where the touch input is disregarded or is not collected, according to the screen features of the display panel 141, and may transfer a touch input that is received in the valid touch area to the controller 160.

According to an embodiment of the present disclosure, the touch panel 143 may configure a valid multi-touch area for the multi-touch input. For example, the touch panel 143 may configure the first screen area where the multi-touch input is detected and the second screen area where the multi-touch input is not detected (for example, is ignored). Alternatively, the touch panel 143 may configure the whole area of the screen as the valid multi-touch area. The valid multi-touch area may be configured depending on the operation status of the electronic device 100 or an application (or an application program) that is being displayed.

The storage unit 150 may store various basic operating systems necessary for the operation of the electronic device 100, data corresponding to various user functions, application programs, or algorithms. The storage unit 150 may store instructions 151 to support the processing of the multi-touch input, according to various embodiments of the present disclosure. And, the instruction 151 is a minimum unit of a program that may be directly executed by the electronic device 100, and a variety of functions may be performed by the execution of the instructions 151.

According to various embodiments of the present disclosure, the instructions 151 may include an output routine to control the output of the image through the display unit 140. Alternatively, the instructions 151 may include an input/output routine to control the input/output of voice through the audio processing unit 130. Alternatively, the instructions 151 may include a transmission/reception routine to control the transmission and reception of data through the communication unit 110. Alternatively, the instructions 151 may include a configuration routine for setting the environment of the electronic device 100.

According to various embodiments of the present disclosure, the instructions 151 may be pre-stored in the storage unit 150, or may be received from an external device to then be stored in the storage unit 150.

According to various embodiments of the present disclosure, the instructions 151 may be defined to correspond to the multi-touch input by the user input.

The controller 160 is configured to control various signal flows, or the collection and output of information in order to support the processing of the multi-touch input according to various embodiments of the present disclosure. The controller 160 may include the configuration as shown in FIG. 2.

According to various embodiments of the present disclosure, the electronic device 100 may further include various additional modules in accordance with a provision type thereof. That is, the electronic device 100 may further include a short-range communication module for short-range communication, an interface for the transmission and reception of data of the electronic device 100 in a wired communication method or wireless communication method, an Internet communication module for performing the Internet function through the Internet network, or a digital broadcasting module for performing a reception and reproduction function of the digital broadcast, which is not mentioned above. These elements may be variously modified according to the convergence trend of digital devices, and may not be all enumerated. However, the electronic device 100 may further include elements equivalent to the above-described elements. Further, in the electronic device of the present disclosure, specific structural elements may be excluded from the above-mentioned configuration or substituted with other structural elements according to their type. This may be easily understood by those skilled in the art to which the present disclosure pertains.

According to various embodiments of the present disclosure, the electronic device 100 may include all information and communication devices and multimedia devices such as a Portable Multimedia Player (PMP), a digital broadcasting player, a Personal Digital Assistant (PDA), a music player (for example, an MP3 player), a portable game terminal, a smart phone, a laptop computer, and a handheld PC and application devices thereof as well as all mobile communication terminals operating based on communication protocols corresponding to various communication systems.

Figure 2:
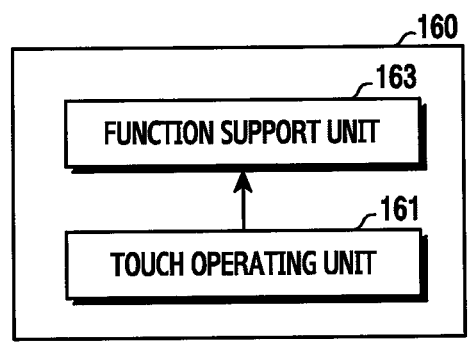
FIG. 2 is a detailed view showing the configuration of a controller, according to an embodiment of the present disclosure.

FIG. 2 is a detailed view showing the configuration of the controller 160, according to an embodiment of the present disclosure.

Referring to FIG. 2, the controller 160, according to an embodiment of the present disclosure, may include a touch operating unit 161 and a function support unit 163.

The touch operating unit 161 may set the touch panel 143 for the touch signal processing of the electronic device 100, and may determine whether or not the touch signal is valid to then be collected. In addition, the touch operating unit 161 may analyze the collected touch input, and may transfer the result thereof to the function support unit 163.

According to various embodiments of the present disclosure, the touch operating unit 161 may detect a multi-touch input through the touch panel 143, and may obtain the number of touch points from the multi-touch input. According to an embodiment, the touch operating unit 161 may obtain the positional relationship between a plurality of touch points. For example, in the case of two touch points, the touch operating unit 161 may obtain the distance between the two touch points. Alternatively, in the case of three or more touch points, the touch operating unit 161 may obtain the arrangement of the touch points based on distances between the three or more touch points. And, the touch operating unit 161 may analyze the multi-touch input by using touch coordinates by the support of the touch panel 143.

According to various embodiments of the present disclosure, the touch operating unit 161 may obtain a user's gesture type that uses a plurality of touch points from the multi-touch input. For example, the touch operating unit 161 may obtain, from the multi-touch input, gesture types, such as a tap gesture, a double-tap gesture, a touch-and-drag gesture, or a flicking gesture.

According to various embodiments of the present disclosure, the touch operating unit 161 may configure a valid screen area for detecting a multi-touch input. For example, if the display of a specific application is detected, the touch operating unit 161 may configure a screen area corresponding to the application as the valid area for detecting the multi-touch input.

The function support unit 163 may operate according to the support of the touch operating unit 161. According to various embodiments of the present disclosure, the function support unit 163 may receive the analysis result of the multi-touch input from the touch operating unit 161 and may load an instruction corresponding thereto from the storage unit 150 to then be executed. And, the instruction may be stored in the controller 160 rather than the storage unit 150. In addition, the function support unit 163 may support the video control of the display unit 140, the audio input/output control of the audio processing unit 130, or the data communication control of the communication unit 110 according to the execution of the instruction. For example, the function support unit 163 may support the selection and execution of one function according to the analysis result from among one or more functions related to the multi-touch input according to the execution of the instruction. Alternatively, the function support unit 163 may support the execution of the application, the end of the application, the switch from an application display screen to a home screen, the display screen switch between the applications, the switch between display modes of the application, or the like, according to the execution of the instruction.

The electronic device, according to various embodiments of the present disclosure, may include: a display unit that provides a screen that receives a touch input; and a controller that detects a touch input that includes a plurality of touch points on the screen, obtains the positional relationship between the plurality of touch points, and performs a function corresponding to the touch input based on the positional relationship.

In the electronic device according to various embodiments of the present disclosure, the controller may obtain the distances between the plurality of touch points with respect to the positional relationship.

In the electronic device according to various embodiments of the present disclosure, the controller may obtain the arrangement of the plurality of touch points based on the distances between the plurality of touch points with respect to the positional relationship.

In the electronic device according to various embodiments of the present disclosure, the controller may obtain the size of the arrangement with respect to the positional relationship.

In the electronic device according to various embodiments of the present disclosure, the controller may identify one or more functions related to the touch input, select one function corresponding to the positional relationship from among the one or more functions and perform the selected function.

In the electronic device according to various embodiments of the present disclosure, the controller may perform a function of executing an application and providing a display screen of the application.

In the electronic device according to various embodiments of the present disclosure, the controller may perform a function of terminating the application that is being displayed.

In the electronic device according to various embodiments of the present disclosure, the controller may perform a function of switching from an application display screen to a home screen.

In the electronic device according to various embodiments of the present disclosure, the controller may perform a function of switching from the first application display screen to the second application display screen.

In the electronic device according to various embodiments of the present disclosure, the controller may perform a function of switching between display modes of an application.

The configuration of the electronic device 100 and the operation of the configuration have been described above, according to the embodiment of the present disclosure. Hereinafter, an item separation method of the electronic device 100 based on the configuration will be described in more detail with reference to the drawings.

Figure 3:
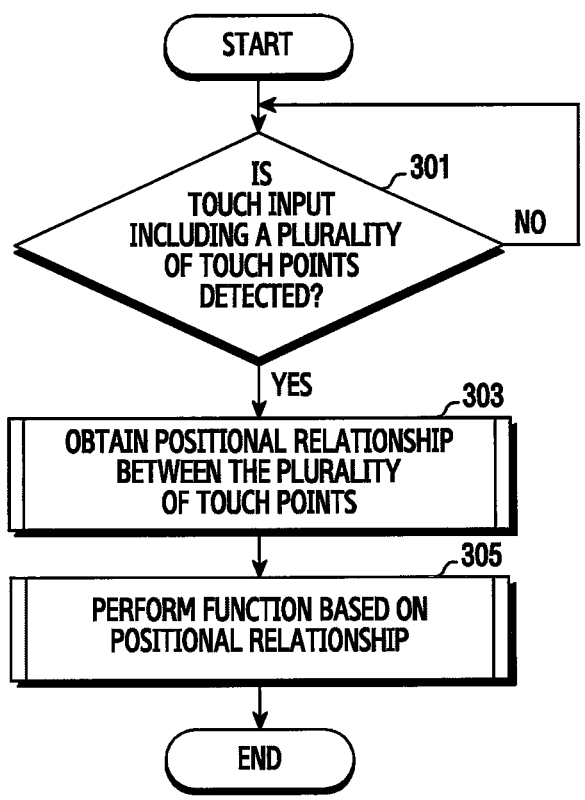
FIG. 3 is a flowchart illustrating a method of performing functions of an electronic device, according to an embodiment of the present disclosure.
Figure 4:
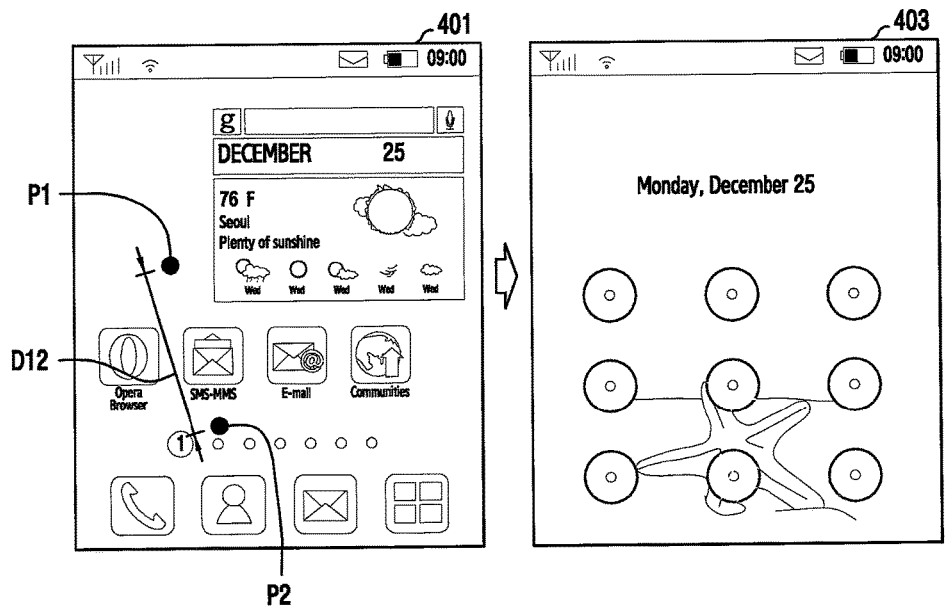
FIG. 4 is an exemplary view to explain a method of performing functions based on a touch, according to various embodiments of the present disclosure.

FIG. 3 is a flowchart illustrating a method of performing functions of the electronic device, according to an embodiment of the present disclosure. In addition, FIG. 4 is an exemplary view to explain a method of performing functions based on a touch, according to various embodiments of the present disclosure.

Referring to FIG. 3, according to an embodiment of the present disclosure, when a touch input including a plurality of touch points occurs, the operation controller 160 may detect the same in operation 301. And, the touch input may include simultaneous touches on two or more points. Alternatively, the touch input may include one touch that occurs on one point and one or more other touches that occur on other points within a threshold time after the previous touch. Alternatively, the touch input may be touches that occur at an interval within a specific time on two or more points. For example, the touch input may be made by a tap gesture on two points P1 and P2 of the screen 401 (e.g., the home screen).

According to various embodiments of the present disclosure, in operation 303, the controller 160 may obtain the positional relationship between a plurality of touch points. And, the positional relationship between a plurality of touch points may be obtained based on the distance. For example, the controller 160 may obtain the distance D12 between two touch points P1 and P2.

According to various embodiments of the present disclosure, in operation 305, the controller 160 may perform a function corresponding to the touch input that includes the plurality of touch points based on the acquired positional relationship. For example, if the distance D12 between two touch points P1 and P2 is equal to, or more than, a reference value, the controller 160 may display a locked screen 403 corresponding to the touch input including the two touch points. On the contrary, if the distance D12 between two touch points P1 and P2 is less than the reference value, the controller 160 may not display the locked screen.

Figure 5:
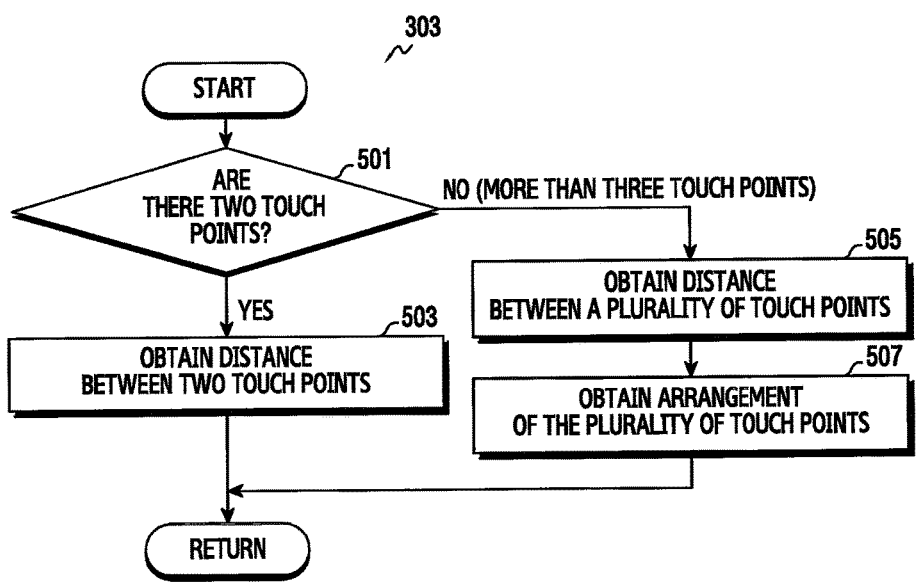
FIG. 5 illustrates the procedure of an operation for obtaining the positional relationship between a plurality of touch points in FIG. 3, according to various embodiments of the present disclosure.
Figure 6:
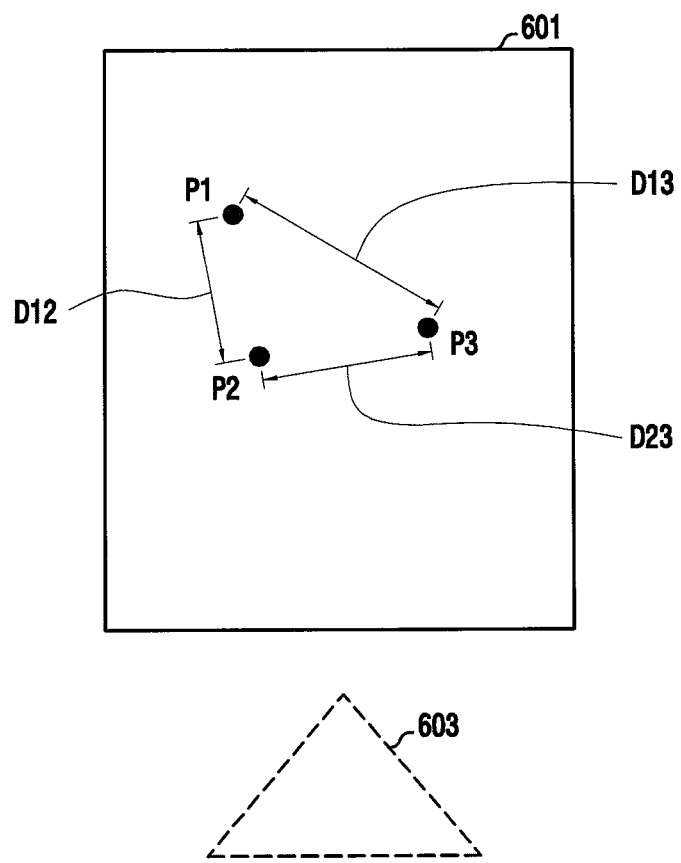
FIG. 6 is an exemplary view to explain an operation for obtaining the positional relationship between a plurality of touch points, according to various embodiments of the present disclosure.

FIG. 5 illustrates the procedure of an operation for obtaining the positional relationship between a plurality of touch points in FIG. 3, according to various embodiments of the present disclosure. In addition, FIG. 6 is an exemplary view to explain an operation for obtaining the positional relationship between a plurality of touch points, according to various embodiments of the present disclosure Referring to FIG. 5, in operation 501, the controller 160 may determine whether a plurality of touch points by the touch input corresponding to two touch points. In the case of two touch points, in operation 503, the controller 160 may obtain a distance between the two touch points.

According to various embodiments of the present disclosure, in the case of three or more touch points, in operation 505, the controller 160 may obtain distances between the plurality of touch points. For example, if three touch points P1, P2, and P3 on the screen 601 are detected, the controller 160 may obtained distances D12, D23, and D13 between the three touch points P1, P2, and P3.

According to various embodiments of the present disclosure, in operation 507, the controller 160 may identify the arrangement of the plurality of touch points based on the distances between the plurality of touch points. For example, the controller 160 may identify a triangular arrangement 603 based on the distances D12, D23, and D13 between the three touch points P1, P2, and P3.

Figure 7:
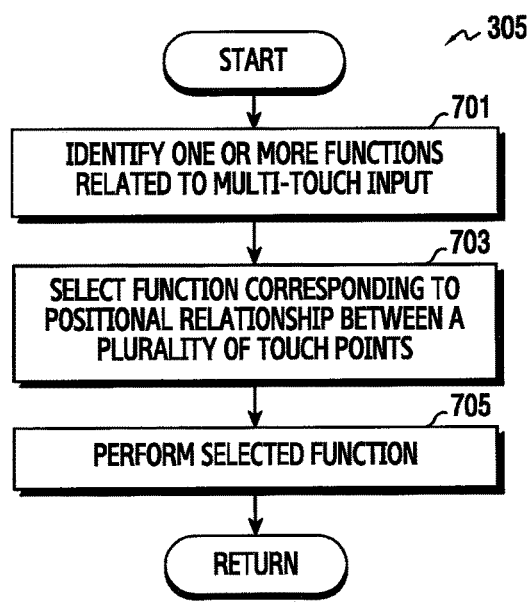
FIG. 7 illustrates the procedure of an operation for performing a function corresponding to a touch input based on the positional relationship between a plurality of touch points in FIG. 3, according to various embodiments of the present disclosure.
Figure 8:
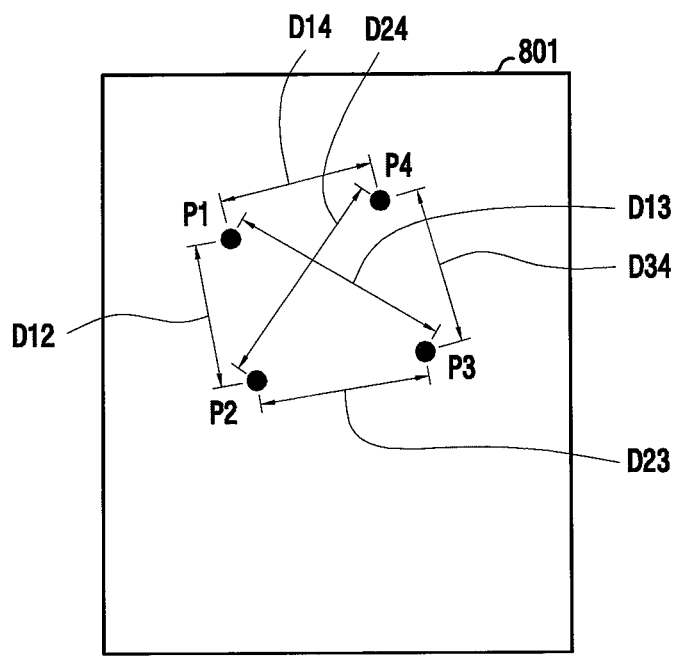
FIG. 8 and FIG. 9 are exemplary views to explain an operation of performing a function corresponding to a touch input based on the positional relationship between a plurality of touch points, according to various embodiments of the present disclosure.
Figure 8:
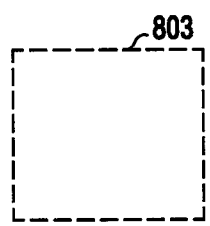
Figure 9:
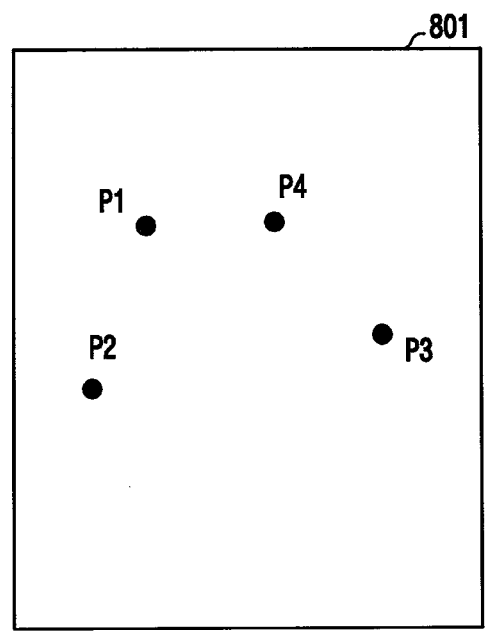
Figure 9:
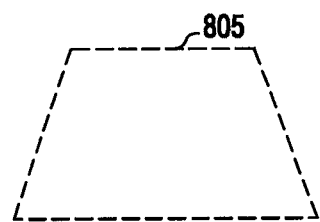

FIG. 7 illustrates the procedure of an operation for performing a function corresponding to a touch input based on the positional relationship between a plurality of touch points in FIG. 3, according to various embodiments of the present disclosure. In addition, FIG. 8 and FIG. 9 are exemplary views to explain an operation of performing a function corresponding to a touch input based on the positional relationship between a plurality of touch points, according to various embodiments of the present disclosure.

Referring to FIG. 7, in operation 701, the controller 160 may identify one or more functions that are related to the touch input (that is, the multi-touch input), which includes a plurality of touch points. And, the touch inputs that use the same number of touch points may correspond to one or more functions. For example, the various functions may be related to a tap gesture type of touch input that uses four touch points, and particularly, the various functions each may correspond to various arrangement structures of four touch points. When a tab gesture type of touch input that uses four touch points P1, P2, P3, and P4 occurs on the screen 801, the controller 160 may detect the arrangement of the touch points, such as a roughly rectangular (square) shape 803 or trapezoidal shape 805, based on the distances D12, D23, D34, D14, D24, and D13 between the four touch points P1, P2, P3, and P4.

According to various embodiments of the present disclosure, in operation 703, the controller 160 may select a function corresponding to the positional relationship between a plurality of touch points from among one or more functions that are related to the multi-touch input. For example, when the rectangular arrangement is detected from the four touch points P1, P2, P3, and P4, the controller 160 may select a first function, and when the trapezoidal arrangement is detected from the four touch points P1, P2, P3, and P4, the controller 160 may select a second function that is different from the first function. In addition, in operation 705, the controller 160 may perform the selected function.

Figure 10:
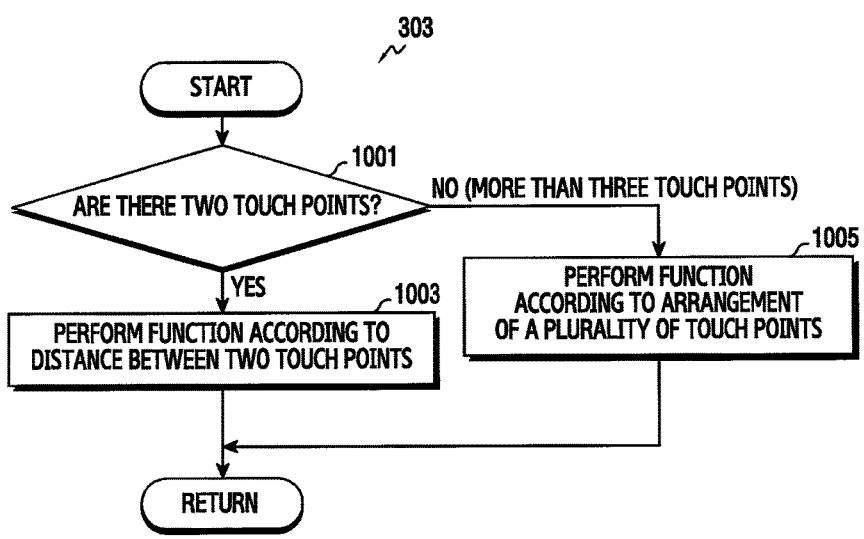
FIG. 10 illustrates the procedure of an operation of performing a function corresponding to a touch input based on the positional relationship between a plurality of touch points in FIG. 3, according to various embodiments of the present disclosure.
Figure 11:
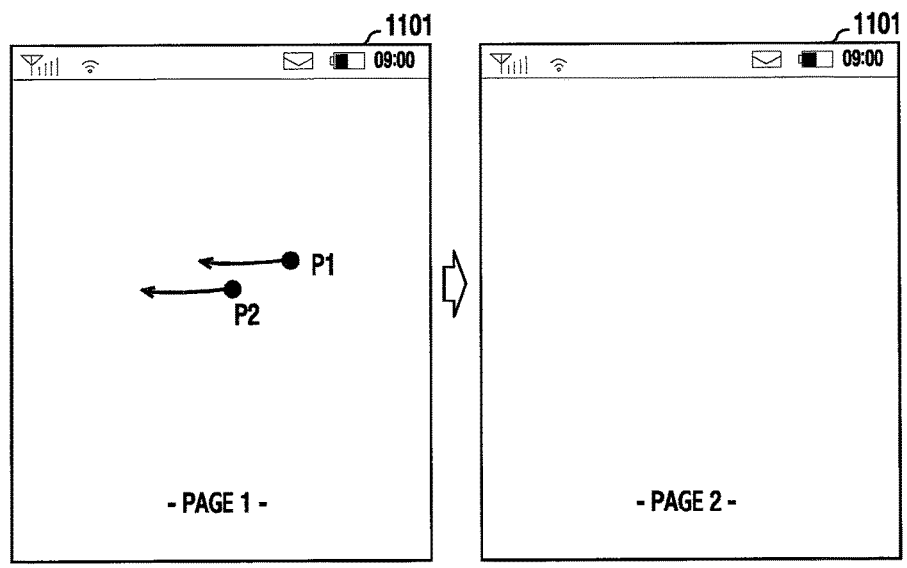
FIG. 11 to FIG. 14 are exemplary views to explain an operation of performing a function corresponding to a touch input based on the positional relationship between a plurality of touch points, according to various embodiments of the present disclosure.
Figure 12:
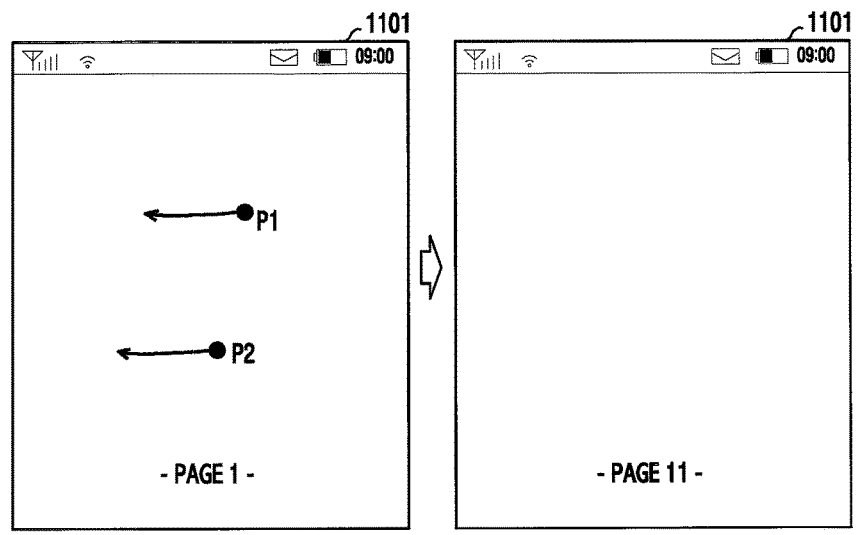
Figure 13:
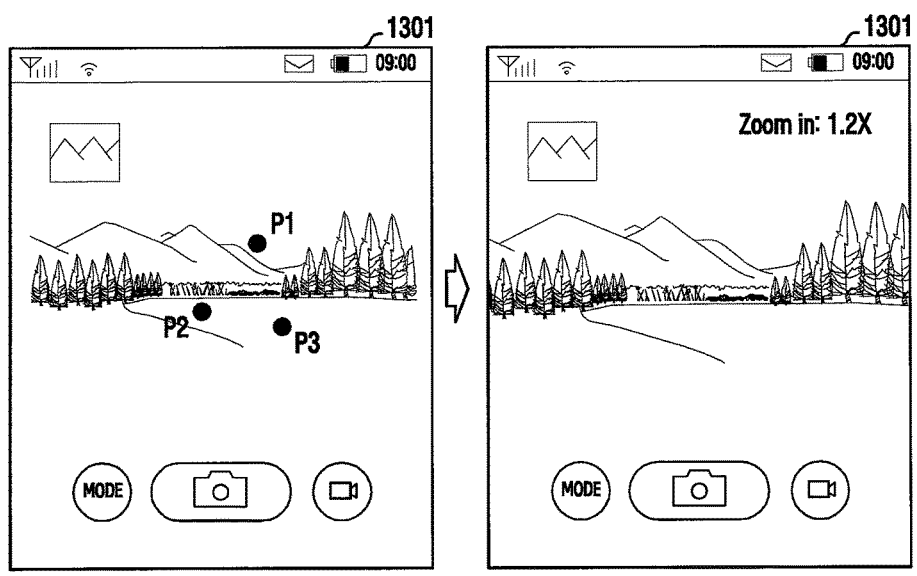
Figure 14:
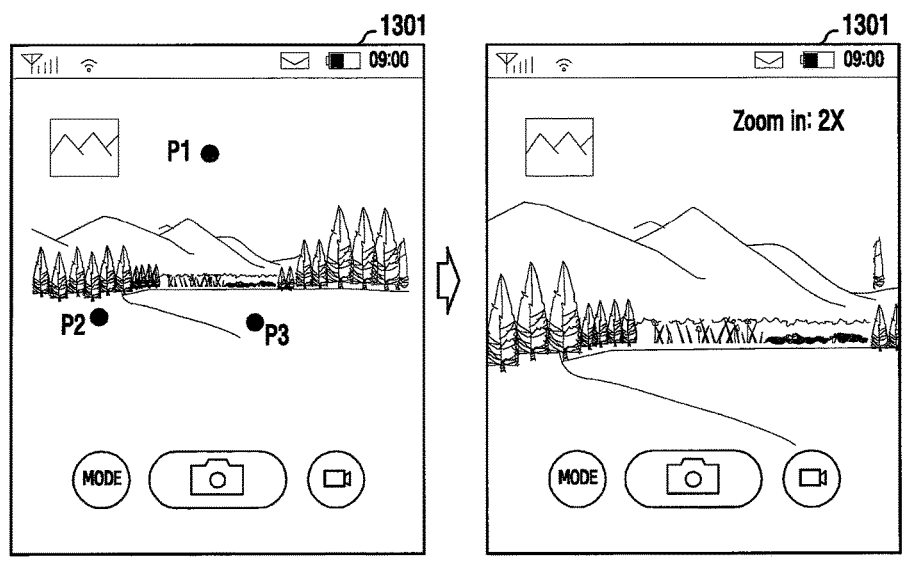

FIG. 10 illustrates the procedure of an operation of performing a function corresponding to a touch input based on the positional relationship between a plurality of touch points in FIG. 3, according to various embodiments of the present disclosure. In addition, FIG. 11 to FIG. 14 are exemplary views to explain an operation of performing a function corresponding to a touch input based on the positional relationship between a plurality of touch points, according to various embodiments of the present disclosure Referring to FIG. 10, in operation 1001, the controller 160 may determine whether or not a plurality of touch points of a touch input corresponding to two touch points. In addition, if there are two touch points, in operation 1003, the controller 160 may perform a function according to a distance between the two touch points. For example, a touch input corresponding to a gesture (e.g., a flicking gesture), in which a touch is made on two touch points P1 and P2 of the screen 1101 and is released after moving, is detected, the controller 160 may switch the content that is displayed on the screen 1101 at the corresponding speed. And, the greater the distance between the two touch points P1 and P2 is, the more quickly the controller 160 may switch the content that is displayed on the screen 1101.

According to various embodiments of the present disclosure, in the case of three or more touch points, in operation 1005, the controller 160 may perform a function according to the arrangement of a plurality of touch points. For example, when three touch points P1, P2, and P3 are detected on the screen 1301 for displaying a camera shooting function, the controller 160 may adjust the zoom-in in proportion to the size of the triangular arrangement. And, the size of the triangular arrangement may be determined based on the distances between the touch points as mentioned above.

Figure 15:
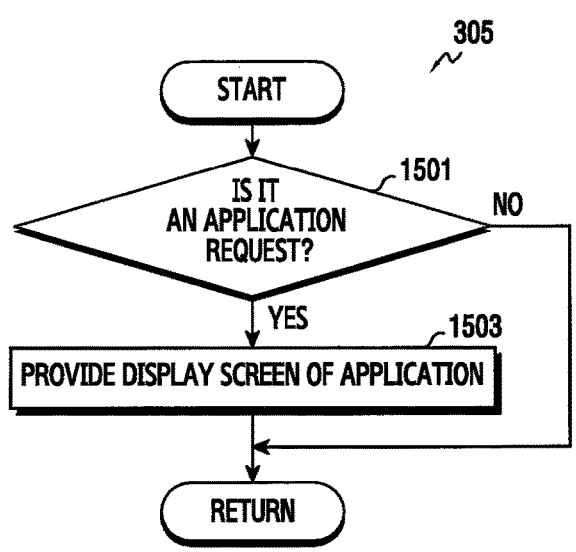
FIG. 15 illustrates the procedure of an operation of performing a function corresponding to a touch input based on the positional relationship between a plurality of touch points in FIG. 3, according to various embodiments of the present disclosure.

FIG. 15 illustrates the procedure of an operation of performing a function corresponding to a touch input based on the positional relationship between a plurality of touch points in FIG. 3, according to various embodiments of the present disclosure.

Referring to FIG. 15, if the function corresponding to the multi-touch input is a request for an application, the controller 160 may detect the same in operation 1501. In addition, in operation 1503, the controller 160 may execute the application and may provide a display screen of the application. For example, referring to FIG. 4, if the distance D12 between the two touch points P1 and P2 is equal to or more than a reference value, a request for the execution of an application is made, and the controller 160 may execute the application to provide a locked screen as shown in the drawing.

Figure 16:
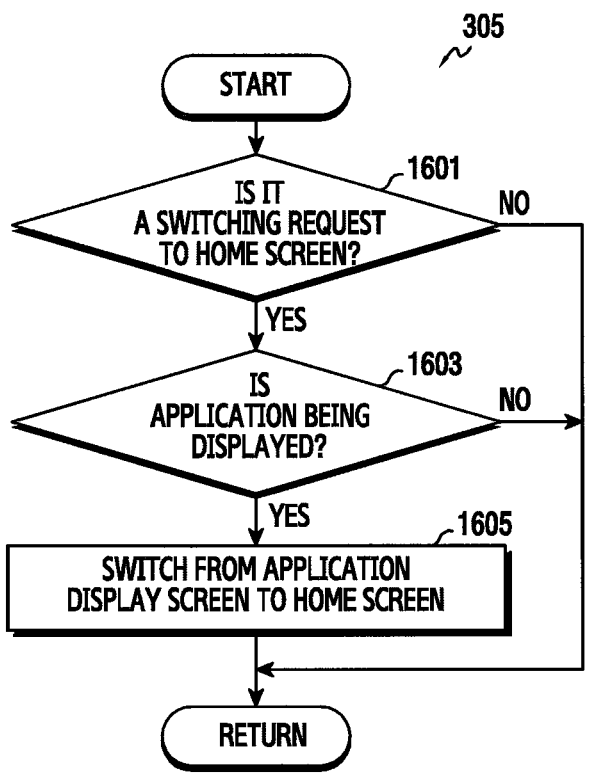
FIG. 16 illustrates the procedure of an operation of performing a function corresponding to a touch input based on the positional relationship between a plurality of touch points in FIG. 3, according to various embodiments of the present disclosure.
Figure 17:
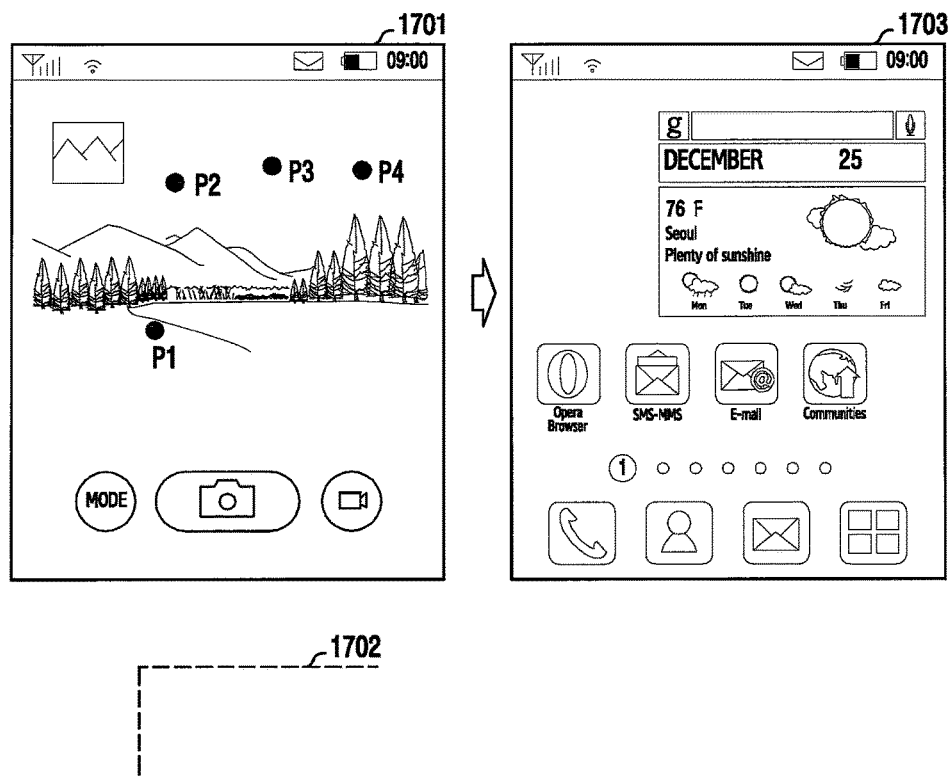
FIG. 17 is an exemplary view to explain an operation of performing a function corresponding to a touch input based on the positional relationship between a plurality of touch points, according to various embodiments of the present disclosure.

FIG. 16 illustrates the procedure of an operation of performing a function corresponding to a touch input based on the positional relationship between a plurality of touch points in FIG. 3, according to various embodiments of the present disclosure. In addition, FIG. 17 is an exemplary view to explain an operation of performing a function corresponding to a touch input based on the positional relationship between a plurality of touch points, according to various embodiments of the present disclosure Referring to FIG. 16, if the function corresponding to the multi-touch input is a switching request to the home screen, in operation 1601, the controller 160 may detect the same. For example, if four touch points P1, P2, P3, and P4 have a roughly "⌈" type of arrangement 1702 as a result of obtaining the positional relationship between a plurality of multi-touch points for a tap gesture type of multi-touch input on the screen 1701, the controller 160 may detect the switching request to the home screen.

According to various embodiments of the present disclosure, while the application is displayed on the screen 1701, the controller 160 may detect the same in operation 1603. In addition, in operation 1605, the controller 160 may switch from the application display screen 1701 to the home screen 1703.

Figure 18:
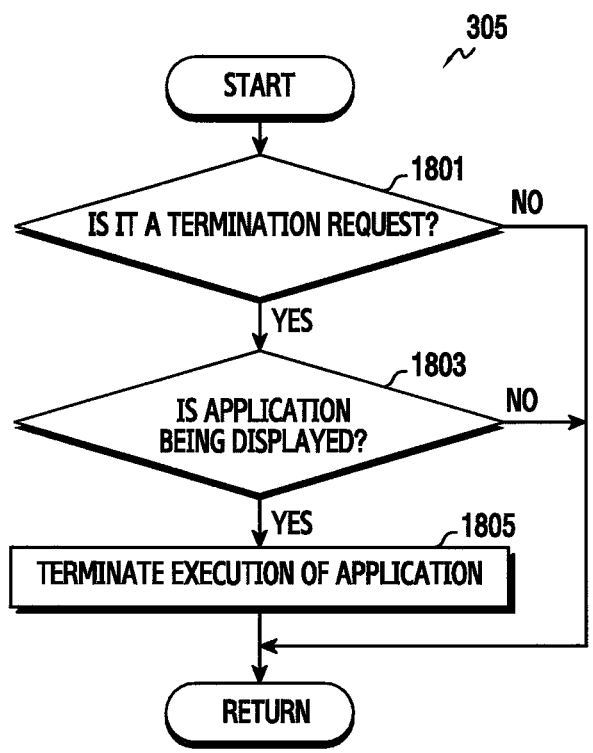
FIG. 18 illustrates the procedure of an operation of performing a function corresponding to a touch input based on the positional relationship between a plurality of touch points in FIG. 3, according to various embodiments of the present disclosure.
Figure 19:
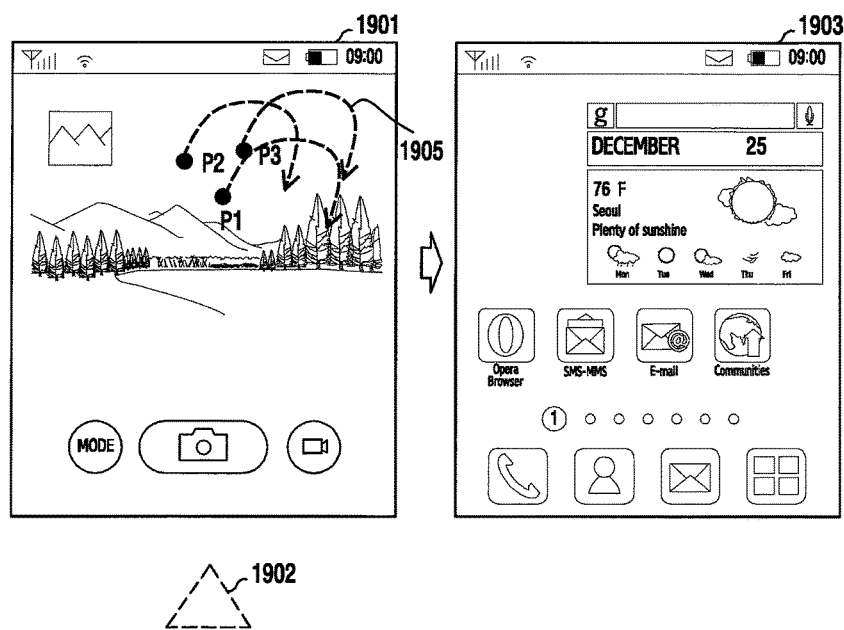
FIG. 19 is an exemplary view to explain an operation of performing a function corresponding to a touch input based on the positional relationship between a plurality of touch points, according to various embodiments of the present disclosure.

FIG. 18 illustrates the procedure of an operation of performing a function corresponding to a touch input based on the positional relationship between a plurality of touch points in FIG. 3, according to various embodiments of the present disclosure. In addition, FIG. 19 is an exemplary view to explain an operation of performing a function corresponding to a touch input based on the positional relationship between a plurality of touch points, according to various embodiments of the present disclosure.

Referring to FIG. 18, if the function corresponding to the multi-touch input is a termination request, in operation 1801, the controller 160 may detect the same. For example, if three touch points P1, P2, and P3 have a roughly triangular arrangement 1902 as a result of obtaining the positional relationship between a plurality of multi-touch points for a touch-and-drag type 1905 of multi-touch input in a circular form on the screen 1901, the controller 160 may detect the termination request. And, the controller 160 may determine the occurrence of the termination request by considering the size of the triangular arrangement 1902 as well.

According to various embodiments of the present disclosure, while the application is displayed on the screen 1901, the controller 160 may detect the same in operation 1803. In addition, in operation 1805, the controller 160 may terminate the application. And, the application may be terminated and the home screen 1903 may be displayed.

Figure 20:
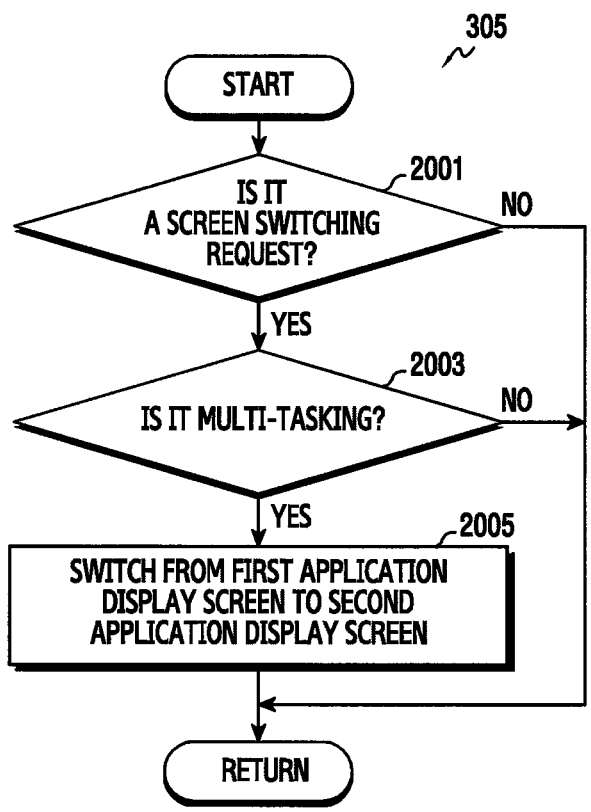
FIG. 20 illustrates the procedure of an operation of performing a function corresponding to a touch input based on the positional relationship between a plurality of touch points in FIG. 3, according to various embodiments of the present disclosure.
Figure 21:
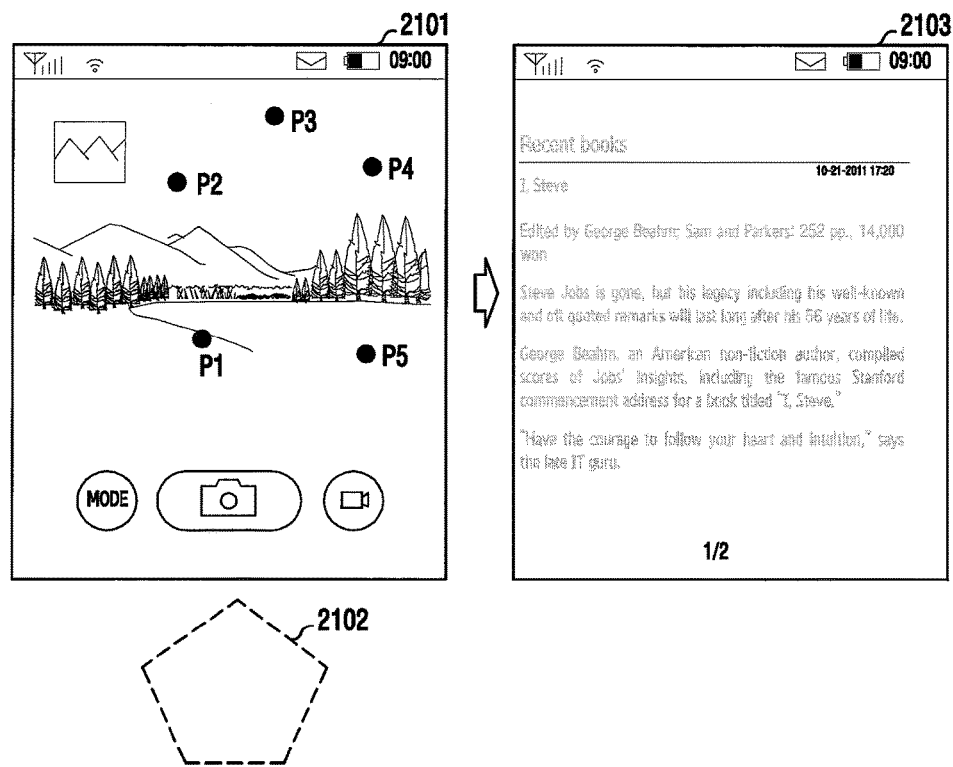
FIG. 21 is an exemplary view to explain an operation of performing a function corresponding to a touch input based on the positional relationship between a plurality of touch points, according to various embodiments of the present disclosure.

FIG. 20 illustrates the procedure of an operation of performing a function corresponding to a touch input based on the positional relationship between a plurality of touch points in FIG. 3, according to various embodiments of the present disclosure. In addition, FIG. 21 is an exemplary view to explain an operation of performing a function corresponding to a touch input based on the positional relationship between a plurality of touch points, according to various embodiments of the present disclosure.

Referring to FIG. 20, if the function corresponding to the multi-touch input is a screen switching request, the controller 160 may detect the same in operation 2001. For example, if five touch points P1, P2, P3, P4, and P5 have a roughly pentagonal arrangement 2102 as a result of obtaining the positional relationship between a plurality of multi-touch points for a tap gesture type of multi-touch input on the screen 2101, the controller 160 may detect the screen switching request. And, the controller 160 may determine the occurrence of the screen switching request by considering the size of the pentagonal arrangement 2102 as well.

According to various embodiments of the present disclosure, when a plurality of applications are in progress, that is, in the case of multi-tasking, the controller 160 may detect the same in operation 2003. In addition, in operation 2005, the controller 160 may switch from the first application display screen 2101 to the second application display screen 2103.

Figure 22:
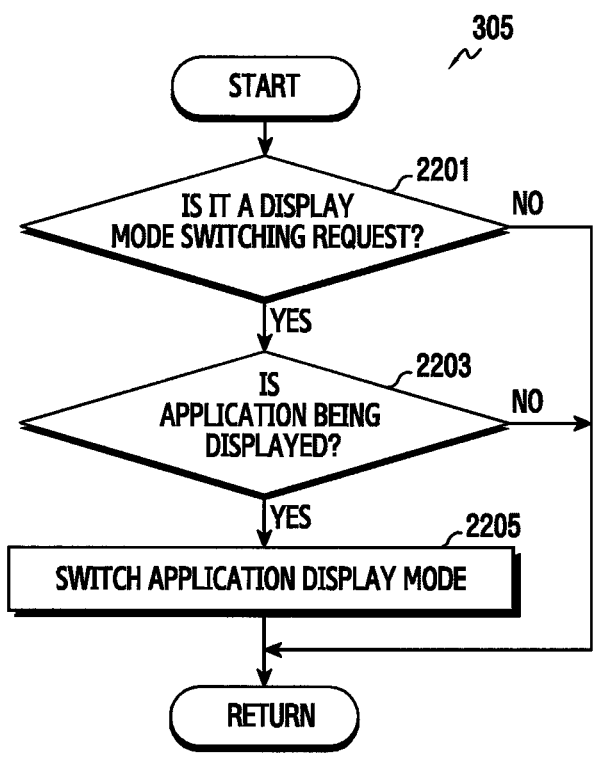
FIG. 22 illustrates the procedure of an operation of performing a function corresponding to a touch input based on the positional relationship between a plurality of touch points in FIG. 3, according to various embodiments of the present disclosure.
Figure 23:
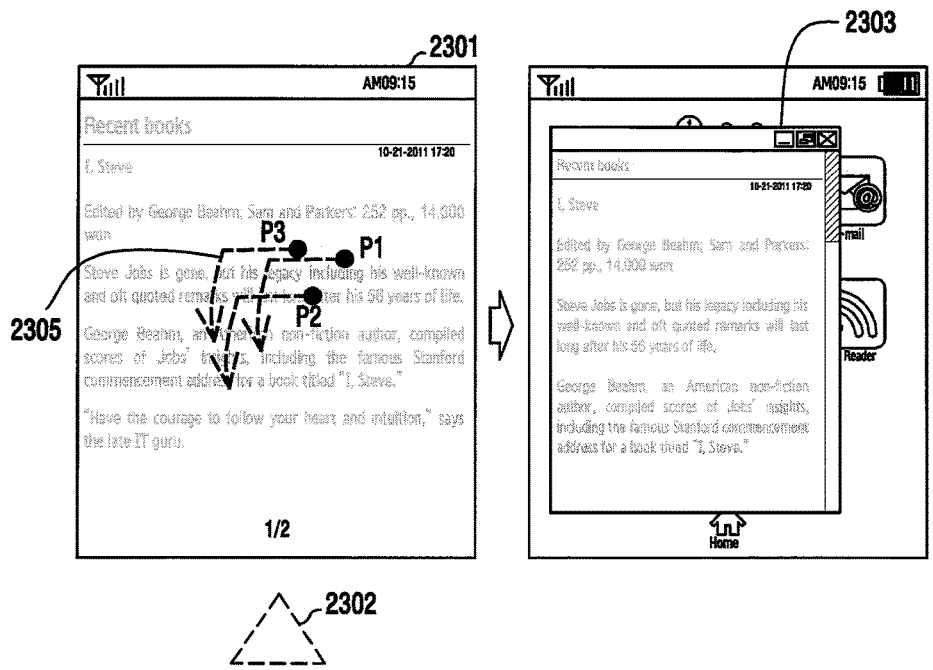
FIG. 23 is an exemplary view to explain an operation of performing a function corresponding to a touch input based on the positional relationship between a plurality of touch points, according to various embodiments of the present disclosure.

FIG. 22 illustrates the procedure of an operation of performing a function corresponding to a touch input based on the positional relationship between a plurality of touch points in FIG. 3, according to various embodiments of the present disclosure. In addition, FIG. 23 is an exemplary view to explain an operation of performing a function corresponding to a touch input based on the positional relationship between a plurality of touch points, according to various embodiments of the present disclosure.

Referring to FIG. 22, if the function corresponding to the multi-touch input is a display mode switching request, the controller 160 may detect the same in operation 2201. For example, if three touch points P1, P2, and P3 have a roughly triangular arrangement 2302 as a result of obtaining the positional relationship between a plurality of multi-touch points for a touch-and-drag gesture type 2305 of multi-touch input in the form of "⌈" on the screen 2301, the controller 160 may detect the display mode change request. And, the controller 160 may determine the occurrence of the display mode change request by considering the size of the triangular arrangement 2302 as well.

According to various embodiments of the present disclosure, when applications are being displayed, the controller 160 may detect the same in operation 2203. In addition, in operation 2205, the controller 160 may switch from the first display mode (e.g., the full screen mode 2301) to the second display mode (e.g., the window mode 2303).

The operating method of an electronic device, according to various embodiments of the present disclosure, may include: detecting a touch input that includes a plurality of touch points on the screen; obtaining the positional relationship between the plurality of touch points; and performing a function corresponding to the touch input based on the positional relationship.

In the operating method of an electronic device, according to various embodiments of the present disclosure, the obtaining of the positional relationship may include obtaining the distances between the plurality of touch points.

In the operating method of an electronic device, according to various embodiments of the present disclosure, the obtaining of the positional relationship may include obtaining the arrangement of the plurality of touch points based on the distances between the plurality of touch points.

In the operating method of an electronic device, according to various embodiments of the present disclosure, the obtaining of the positional relationship may include obtaining the size of the arrangement.

In the operating method of an electronic device, according to various embodiments of the present disclosure, the performing of the function may include: identifying one or more functions related to the touch input; selecting one function corresponding to the positional relationship from among the one or more functions; and performing the selected function.

In the operating method of an electronic device, according to various embodiments of the present disclosure, the performing of the function may include executing an application and providing a display screen of the application.

In the operating method of an electronic device, according to various embodiments of the present disclosure, the performing of the function may include terminating the application that is being displayed.

In the operating method of an electronic device, according to various embodiments of the present disclosure, the performing of the function may include switching from an application display screen into a home screen.

In the operating method of an electronic device, according to various embodiments of the present disclosure, the performing of the function may include switching from the first application display screen to the second application display screen.

In the operating method of an electronic device, according to various embodiments of the present disclosure, the performing of the function may include switching between display modes of an application.

Methods stated in claims and/or specifications according to various embodiments may be implemented by hardware, software, or a combination of hardware and software. In the implementation of software, a computer-readable storage medium for storing one or more programs (software modules) may be provided. The one or more programs stored in the computer-readable storage medium may be configured for execution by one or more processors (for example, controller 160) within the electronic device. The at least one program may include instructions that cause the electronic device to perform the methods according to various embodiments of the present disclosure as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the may form a memory in which the program is stored. Further, a plurality of such memories may be included in the electronic device.

According to various embodiments of the present disclosure, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In various specific embodiments of the present disclosure as described above, an element or elements included in the present disclosure are expressed in a singular form or plural form according to the presented specific embodiments. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of an electronic device, the method comprising:
   receiving a touch input comprising a plurality of touch points on a screen;
   identifying an application mapped to the touch input, wherein a first application has been mapped to two touch points and a second application has been mapped to three touch points;
   in response to identifying that the touch points correspond to the two touch points, identifying a distance between the two touch points and executing a first function for at least one of activating, terminating and switching to the first application based on the distance; and
   in response to identifying that the plurality of touch points corresponds to the three touch points, identifying an arrangement of the three touch points and executing a second function for at least one of activating, terminating and switching to the second application based on the arrangement,
   wherein the activating or switching to the first or the second application comprises changing a state of the first or the second application from a background state to a foreground state, respectively, and displaying, in response to the executing the first or the second function, a user interface (UI) of the first or the second application, respectively.

2. The method of claim 1, further comprising, based on determining that the distance between the two touch points corresponds to a first designated value, displaying a designated user interface (UI) upon activating the first application.

3. The method of claim 1, wherein the identifying the arrangement comprises identifying distances among the three touch points.

4. The method of claim 3, wherein the identifying the arrangement comprises identifying a size of the three touch points.

5. The method of claim 4, wherein the identifying the arrangement comprises identifying a shape of the three touch points.

6. The method of claim 1, wherein the terminating the first or the second application comprises changing a state of the first or the second application from a foreground state to a background state.

7. The method of claim 1, further comprising:
   detecting whether the touch points have been moved;
   identifying a speed of the movement of the touch points; and
   switching content of a designated user interface (UI) displayed upon activating the first or the second application, based on the identified speed.

8. An electronic device comprising:
   a display unit;
   a memory storing instructions; and
   at least one processor, electrically coupled to the display unit and the memory, configured to execute the stored instructions to:
   receive a touch input comprising a plurality of touch points in a screen;
   identify an application mapped to the touch input, wherein a first application has been mapped to two touch points and a second application has been mapped to three touch points;
   in response to identifying that the plurality of touch points correspond to the two touch points, identify a distance between the two touch points and execute a first function for at least one of activating, terminating and switching to the first application based on the distance; and
   in response to identifying that the plurality of touch points corresponds to the three touch points, identify an arrangement of the three touch points and execute a second function for at least one of activating, terminating and switching to the second application based on the arrangement,
   wherein the activating or switching to the first or the second application comprises changing a state of the first or the second application from a background state to a foreground state, respectively, and displaying, in response to the executing the first or the second function, a user interface (UI) of the first or the second application, respectively.

9. The electronic device of claim 8, wherein the at least one processor is further configured to:
based on determining that the distance between the two touch points corresponds to a first designated value, displaying a designated user interface (UI) upon activating the first application.

10. The electronic device of claim 8, wherein the at least one processor is further configured to:
identify distances among the three touch points for identifying the arrangement of the three touch points.

11. The electronic device of claim 10, wherein the identifying the arrangement comprises identifying a size of the three touch points.

12. The electronic device of claim 10, wherein the identifying the arrangement comprises identifying a shape of the three touch points.

13. The electronic device of claim 8, wherein the processor is further configured to change a state of the first or the second application from a foreground state to a background state by terminating the first or the second application, respectively.

14. The electronic device of claim 8, further comprising:
detecting whether the touch points have been moved;
identifying a speed of the movement of the touch points; and
switching content of a designated user interface (UI) displayed upon activating the first or the second application, based on the identified speed.

* * * * *